May 10, 1966  J. C. HUBBS ET AL  3,250,990
INSTRUMENT FOR MEASURING TRANSIENT CHARACTERISTICS
Filed Jan. 23, 1961  3 Sheets-Sheet 1
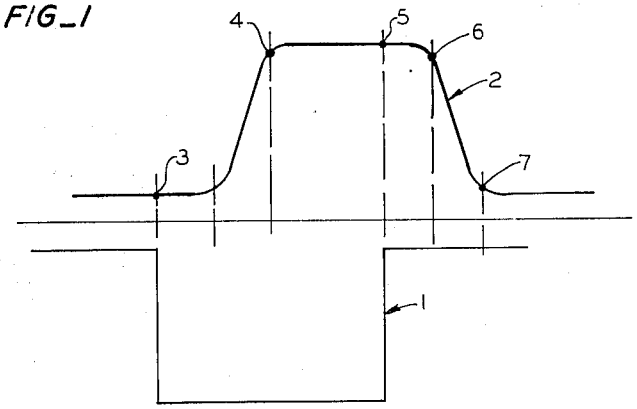
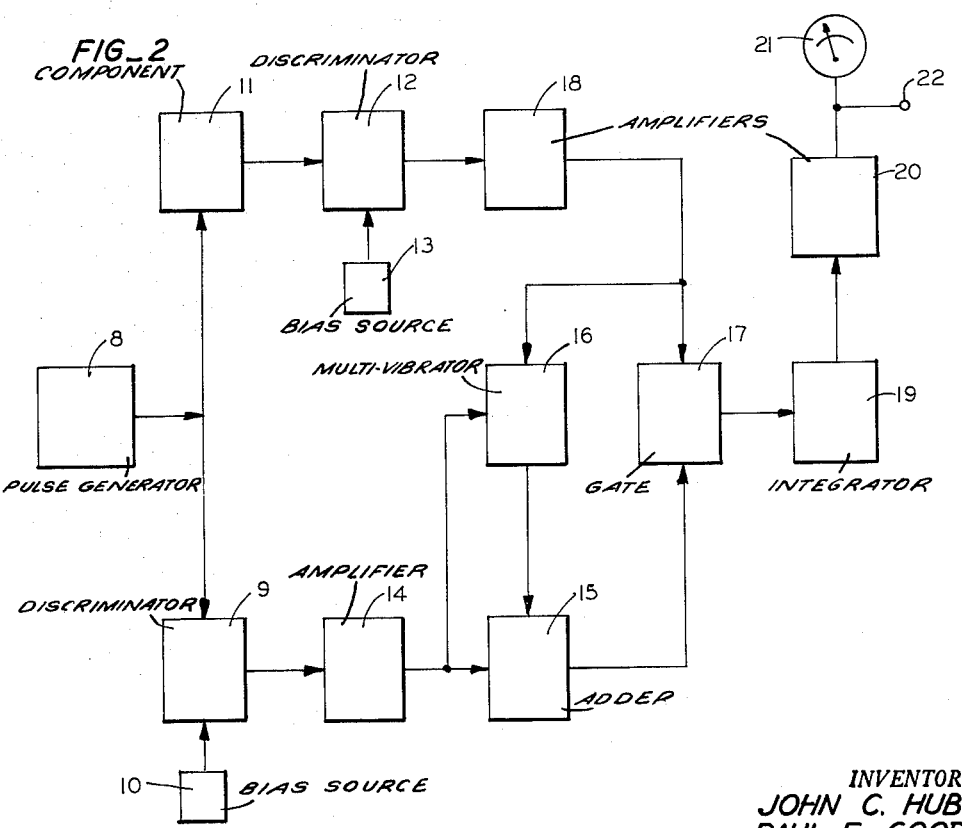
INVENTORS
JOHN C. HUBBS
PAUL E. GOODALE
BY Hoppe and Mitchell
ATTORNEYS

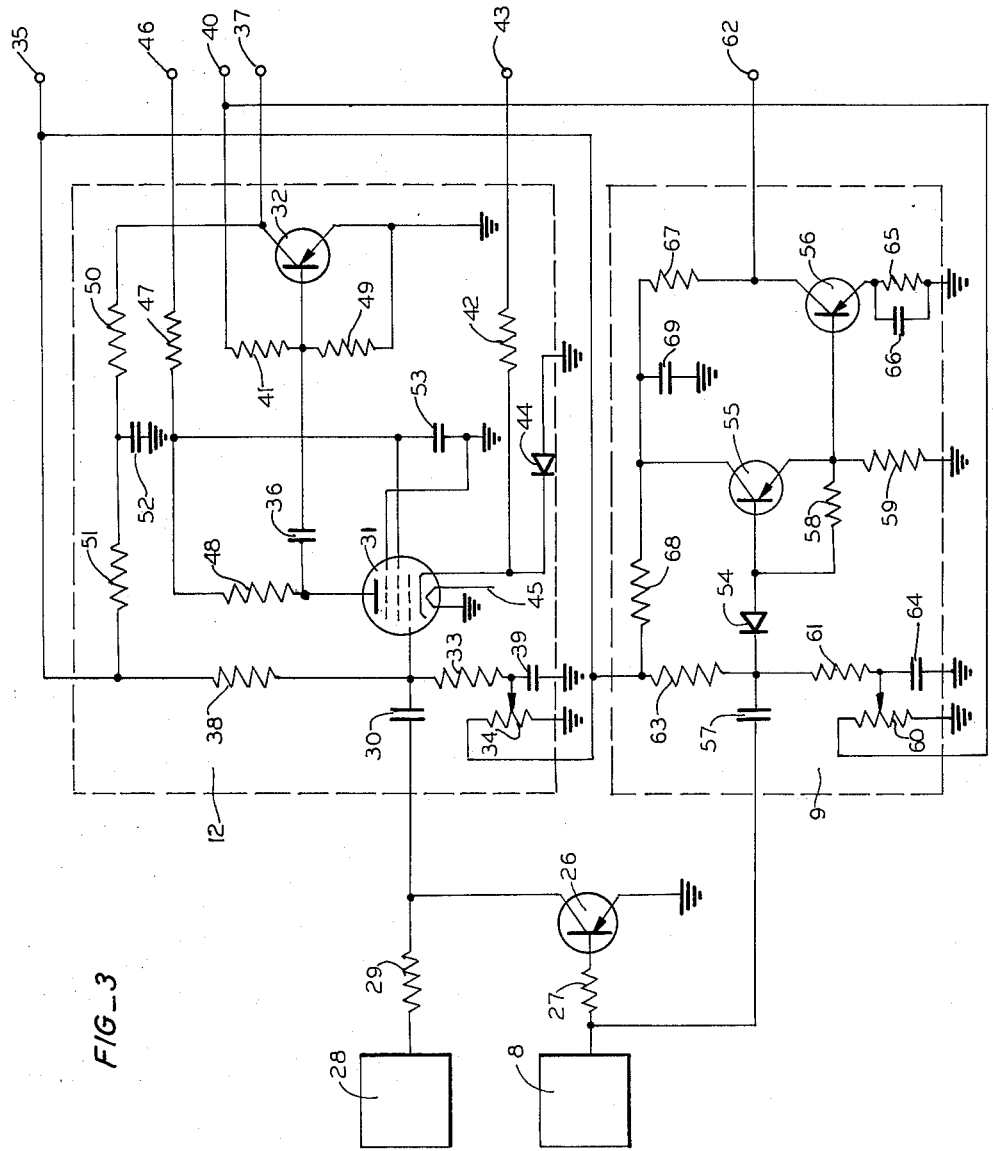

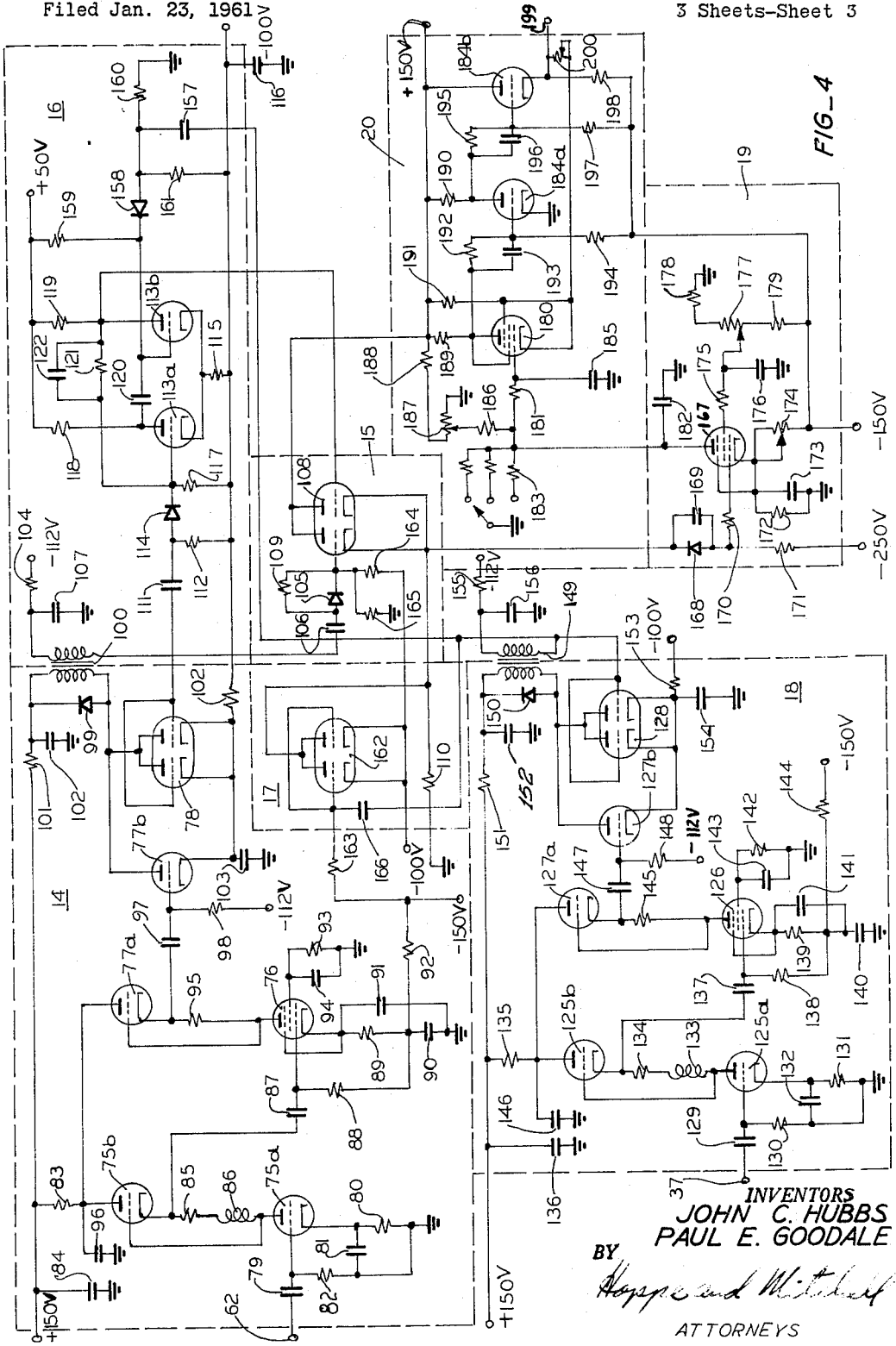

United States Patent Office 3,250,990
Patented May 10, 1966

3,250,990
INSTRUMENT FOR MEASURING TRANSIENT CHARACTERISTICS
John C. Hubbs, Lafayette, and Paul E. Goodale, Pleasant Hill, Calif., assignors to E. H. Research Laboratories, Inc., Oakland, Calif., a corporation of California
Filed Jan. 23, 1961, Ser. No. 84,403
3 Claims. (Cl. 324—57)

This invention relates generally to instruments for measuring transient characteristics and more particularly to an instrument for measuring the switching transient characteristics of high speed solid state devices or the transient response of various electronic components.

One object of the present invention is to provide a versatile instrument which is useful for measuring, without the aid of oscilloscopes or other secondary devices, the transient characteristics of various solid state devices as well as for measuring the transient response of cables, pulse transformers, delay lines, amplifiers and similar high speed devices.

Another object of this invention is to provide an accurate instrument for independently measuring by analog methods any one or more of the short time intervals of interest of a particular transient function under consideration.

Still another object of the present invention is to provide an instrument having extremely fast response and millimicrosecond sensitivity for measuring repeatedly a time interval of interest and for averaging the results over many individual measurements for better ultimate time resolution.

It is also an object of the present invention to provide means for discriminating voltage levels of a transient function with a minimum of loading of the source.

A further object of this invention is to provide an accurate and economical instrument utilizing value sensing discriminators to produce a repetitive pulse waveform having a pulse width equal to the particular time of interest of the transient being measured.

One other object of this invention is to produce a mean current output proportional to the mean duty cycle of an arbitrarily shaped series of input pulses.

The foregoing and other objects and advantages of this invention will become apparent to those skilled in this art upon an understanding of the following description considered in connection with the accompanying drawings illustrating an embodiment of the present invention wherein FIG. 1 is an illustration of the usual switching transient parameters of a transistor;

FIG. 2 is a block diagram of a time measurement channel having features of the present invention;

FIG. 3 is a circuit diagram illustrating a specific form of value sensing discriminator useful in this invention; and FIG. 4 is a circuit diagram of one embodiment of the several components of the time measurement channel of FIG. 2.

This invention utilizes a mercury switch or other form of pulse generator to produce a rapidly rising and falling signal for repetitively driving the component, the transient characteristics of which are to be tested. Value sensing discriminators, biased to predetermined values of the measured transient, and related circuits develop a series of repetitive pulses having a pulse width equal to the particular time of interest under consideration. These pulses are further processed in an independent time measurement channel with the measured characteristic ultimately displayed directly upon a panel meter and also as analog voltage. Several independent time measurement channels are provided in the described instrument in order to measure independently any one or more time intervals of the particular transient function under consideration.

For example, the present invention is useful for measuring the switching characteristics of high speed transistors. FIG. 1 illustrates the usual switching transient parameters of a transistor. The square wave 1 represents one base drive pulse which is part of the signal generated by the pulse generator of the present invention. The corresponding collector swing is illustrated as curve 2. The turn-on time of the transistor including delay time and rise time, is indicated as between points 3, 4. The storage time is indicated between points 5, 6 of curve 2, and the fall time lies between points 6, 7.

The specific embodiment of the invention described herein has three indepedent time measurement channels useful for simultaneously measuring transistor turn-on time 3, 4; storage time, 5, 6; and fall time 6, 7. The block diagram of FIG. 2 represents one of these independent time channels. A mercury switch or similar pulse generator is utilized as a common source of repetitive pulses for each channel and for driving the component to be tested, for purposes of illustration, a transistor having the transient parameters of FIG. 1. The pulse generator is indicated as 8 in FIG. 2. The generated signal is supplied directly to a first value sensing discriminator 9. Discriminator 9 is adjustably biased at 10 to a predetermined value so that it will produce an output only at a predetermined value of the transient curve, for example, the beginning of the turn-on time interval, point 3 of FIG. 1.

The driving pulses also are supplied directly to the component being tested, which is indicated as 11 in FIG. 2. The output of the component, for instance, the output of the collector of the transistor of FIG. 1, is supplied to a second value sensing discriminator 12, which also is individually biased as at 13. Discriminator 12 fires only when a predetermined value of the transient function is reached such as the end of the turn-on interval, point 4 of FIG. 1.

The output of the first value sensing discriminator 9 is amplified in a first pulse amplifier 14 and the amplified pulses are supplied to adder 15. The output of pulse amplifier 14 also triggers a one-shot multivibrator 16 into its timing state. The output of the multivibrator 16 also is applied to adder 15. Thus, a fast rising pulse of long duration is formed as the adder output from a combination of the fast rising output of pulse amplifier 14 and the slower rising, but sustained, output from multivibrator 16. The adder output is supplied to gate means 17 to form the leading edge of a series of repetitive gated pulses.

When the collector voltage of the transistor being tested reaches the bias voltage of value sensing discriminator 12, the discriminator sends an output pulse to the second pulse amplifier 18. The output of this pulse amplifier 18 inhibits gate means 17 and also back-triggers the multivibrator 16 forcing it to end its timing state. The output of gate means 17 is inhibited by the output of discriminator 12 until multivibrator 16 has had sufficient time to switch back to its stable state. Thus, the output of gate means 17 is a series of fast rising and falling repetitve, pulses, the width of which is equal to the time interval between the outputs of value sensing discriminators 9 and 12. The width of the pulse is integrated by integrator 19. The resultant voltage is amplified by D.-C. amplifier 20 and the output of the D.-C. amplifier is displayed on panel meter 21 and also appears at terminal 22 as an analog voltage.

A circuit substantially identical to the foregoing is useful for the testing of any component. The only dissimilarities are appropriate changes in connections to the component or polarity changes for different types of transistors or diodes. Several of the described independent time measurement channels are provided in the instrument of the present invention to enable simultaneous measurement of one or more times of interest of the transient under consideration.

Value sensing discriminators in the form of voltage discriminators are illustrated in FIG. 3. It will be apparent to those skilled in this art that other value sensing circuits are equally applicable, such as current sensing discriminators or the like. A positive discriminator is used to discriminate on positive going wave forms and is indicated as value sensing discriminator 12 of FIG. 2. Discriminator 12 is capacitively coupled to the collector of transistor 26 undergoing test. The base of transistor 26 is driven in its saturated mode by the signal from pulse generator 8 through base resistor 27. The emitter of transistor 26 is grounded. A variable collector supply 28 is connected to collector resistor 29. The collector output through coupling condenser 30 supplies the grid of a sharp cut-off pentode 31, as the discriminator, followed by a transistor inverter 32.

The control grid of discriminator 31 is established at a negative potential through resistor 33 by variable resistor 34 connected across ground and the negative 22 volt terminal 35 of the power supply. Hence, the switching point of discriminator 31, relative to the positive going transient function under observation, may be set at a predetermined value. When the input to the grid of discriminator 31 moves positive the discriminator conducts, causing a negative pulse at its plate which through capacitor 36 drives the base of inverter 32 negative. The collector of the inverter then becomes positive to produce an output signal from the positive discriminator 12 at terminal 37. The negative 22 volt supply also is applied to the grid of discriminator 31 through resistor 38 so that, when the voltage at the juncture of resistor 33 and grounded capacitor 39 is zero, the output of discriminator 31 is just cut off. A positive voltage is applied to the base of inverter 32 from the positive 22 volt supply terminal 40 through resistor 41 in order that the discriminator 31 operates in its highest *gm* region when transistor 32 becomes active.

When the current through discriminator 31 reaches a value determined by resistor 42 connected to a 10-volt D.-C. terminal 43 of the power supply, diode 44 in the cathode circuit becomes reversed biased and the cathode of discriminator 31 then is able to follow the grid, if the grid becomes positive. This keeps the grid to cathode diode 44 of pentode 31 from loading the input signal.

A 6.3 volt filament supply is provided at 45. A positive 150 volt plate supply from terminal 46 is supplied through series resistors 47 and 48 to the discriminator 31. The emitter circuit of inverter 32 is grounded and provided with resistor 49 to its base. The collector of transistor 32 is connected through series resistors 50 and 51 to the negative 22 volt supply and through capacitor 52 at the juncture of resistors 50, 51 to ground. The screen grid of discriminator 31 is connected to the plate supply at the juncture of series resistors 47 and 48 and through condenser 53 is connected to the grounded suppresser grid.

For measuring turn-on time of the transistor of FIG. 1 the positive discriminator 12 is biased to switch at point 4 of the transient curve of the transistor and thus inhibit gate means 17. Discriminator 12 does not discriminate at an absolute voltage, but on a positive going wave form which has moved a number of volts determined by the setting on the discriminator variable resistor 34.

A negative value sensing discriminator 9 is biased to discriminate on the negative going base drive pulse 1 at point 3 of FIG. 1. The negative discriminator 9 illustrated in FIG. 3 comprises diode 54 used as a voltage discriminator, followed by a two stage amplifier including emitter-follower transistor 55 and inverter transistor 56. The signal from pulse generator 8 is supplied to the cathode of diode 54 through coupling capacitor 57. In the quiescent state the anode of diode 54 is referenced to ground through series resistors 58 and 59. A positive 22 volt bias, variable by means of variable resistor 60 connected across terminal 40 and ground, is applied to the cathode of diode 54 through resistor 61.

When the input to discriminator 9 has moved in a negative direction an amount equal to the positive voltage at the cathode of diode 54, the device conducts, causing the emitter-follower transistor 55 to become negative and drive the base of inverter transistor 56 negative. The emitter of inverter transistor 56 is degenerated so that the output from its collector has a fast rise followed by a much slower moving wave front and appears at output terminal 62. Resistor 58 is returned to the emitter of transistor 55 and there is very little voltage drop produced across the resistor. Thus, when the discriminator becomes active the additional loading is quite small.

A negative voltage of 22 volts is applied to the cathode through resistor 63 to offset the forward voltage drop across diode 54. The diode is just cut off when the voltage at the juncture between resistor 61 and grounded condenser 64 is zero. The emitter of transistor 56 is grounded through resistor 65 and bypass condenser 66. Its collector through resistor 67 is coupled to the collector of transistor 55, which in turn is connected through resistor 68 to the negative 22 volt supply. The juncture between resistors 67, 68 is grounded through condenser 69.

*Discriminator circuit values*

| | |
|---|---|
| Condensers 30, 36 | .01 mfd. |
| Pentode 31 | 6688 Amperex. |
| Condenser 30, 36, 39, 52, 53, 57, 64, 69 | .01 mfd. |
| Pentode 31 | 6688 Amperex. |
| Transistor 32, 55, 56 | Type 1143 Texas. |
| Resistor 33, 38 | 300,000 ohms. |
| Variable resistor 34, 60 | 20,000 ohms. |
| Resistor 41 | 200,000 ohms. |
| Resistor 42 | 2,400 ohms. |
| Diode 44 | G29B-5 Hewlett Packard. |
| Resistor 47, 49 | 10,000 ohms. |
| Resistor 48 | 620 ohms. |
| Resistor 50, 65, 67 | 1,000 ohms. |
| Resistor 51, 68 | 3,300 ohms. |
| Diode 54 | SD500 Int'l Rectifier. |
| Resistor 58 | 33,000 ohms. |
| Resistor 59 | 5100 ohms. |
| Resistor 61 | 33,000 ohms. |
| Resistor 63 | 560 ohms. |
| Condenser 66 | .001 mfd. |

The circuit details of the other components of the time measurement channel of FIG. 2 are shown in FIG. 4. For measuring the turn-on time interval of a transistor, the output from negative discriminator 9 is amplified in pulse amplified 14. Pulse amplifier 14 is a multistage unit including double triode 75a, 75b; pentode 76; double triode 77a, 77b; and double triode 78. The output at terminal 62 of discriminator 9 is supplied through coupling condenser 79 to the grid of the first stage vacuum tube 75a which is provided with a cathode bias in its grounded cathode circuit including resistor 80, parallel condenser 81 and coupling resistor 82. The plate output is supplied directly to the grid of triode 75b, the other half of the tube. The plate of tube 75b is connected to the positive 150 volt plate supply through plate resistor 83. Bypass condenser 84 is provided from the 150 volt supply to ground. The output of this stage appears in the cathode circuit of tube 75b which is connected to the plate of tube 75a through series resistor 85 and inductor 86.

Triode 75b is R-C coupled to the control grid of pentode 76 by condenser 87 and resistor 88. Its grounded cathode circuit includes resistor 89, series condenser 90 and bypass condenser 91. Grid bias is provided through resistor 92 from the negative 150 volt supply. The suppressor grid of pentode 76 is directly connected to the cathode circuit and the screen grid is connected through resistor 93 and by-pass condenser 94 to ground. The output appearing in the plate of pentode 76 is connected directly to the grid of triode 77a. The plate also is connected directly by resistor 95 to the cathode of triode 77a. The plate is supplied from the positive 150 volt supply through resistor 83 at the same potential as the plate of triode 75b. The plate circuit is grounded through condenser 96.

The output of triode 77a is taken from the cathode circuit and is R-C coupled by capacitor 97 and resistor 98 to the second half of the tube, 77b. Grid bias is supplied from the negative 112 volt supply. The plate output of triode 77b passes directly to the parallel plates of double triode 78 and to diode 99 connected in parallel with one winding of coupling transformer 100. The same winding also is connected through resistor 101 to the positive 150 volt supply and through by-pass condenser 102 to ground. The parallel cathodes of tube 78 and the cathode of 77b are supplied from the negative 100 volt supply through resistor 102. The cathode circuit is grounded through by-pass capacitor 103.

The pulse output of pulse amplifier 14 is coupled to adder 15 by coupling transformer 100 having its output winding connected to the negative 112 volt power supply through resistor 104 and to diode 105 in the adder circuit through capacitor 106. By-pass condenser 107 connects the winding to ground. Diode 105 is connected directly to one grid of double triode 108. Bypass resistor 109 is provided around diode 105. The positive 150 volt supply furnishes plate voltage to both plates of double triode 108 connected in parallel and both of its parallel cathodes are grounded through resistor 110.

Both grids of double triode 78 in pulse amplifier 14 are connected through coupling condenser 111 and resistor 112 to trigger the multivibrator 16. The multivibrator comprises double triode 113a and 113b. The output from pulse amplifier 14 controls the multivibrator 16 and passes through diode 114 to the grid of one side of multivibrator tube 113a. The cathodes of both multibrator tubes 113a and 113b are joined in parallel through resistor 115 to the negative 100 volt supply and through condenser 116 to ground. Resistor 117 connects the grid of 113a to the cathode circuit. Plate voltage is supplied to 113a and 113b from the positive 50 volt supply through plate resistors 118 and 119, respectively. The plate output of triode 113a is funished through coupling condenser 120 to the grid of 113b. The grid of 113a is coupled to the plate circuit of 113b through resistor 121 and parallel capacitor 122.

The output of multivibrator 16 from the plate circuit of 113b is returned directly to the other grid of double triode 108 in adder 15. Thus, the output of the multivibrator 16 and pulse amplifier 14 are combined in adder 15. The fast rising pulse from pulse amplifier 14 and the slower rising, but sustained, pulse from the multivibrator are added together to produce a fast rising pulse of long duration at gate means 17 and at the input to integrator 19.

The output of value sensing discriminator 12 is supplied to pulse amplifier 18 comprising several stages similar to those of pulse amplifier 14, including double triode 125a, 125b; pentode 126; double triode 127a, 127b; and double triode 128. In the described embodiment discriminator terminal 37 is R-C coupled through condenser 129 and resistor 130 to the grid of triode 125a having a grounded cathode circuit including resistor 131 and by-pass condenser 132. The plate output goes directly to the grid of the other half of the tube, 125b. The plate is connected directly to the cathode of 125b through inductor 133 and resistor 134 in series. Plate voltage is provided from the positive 150 volt source through plate resistor 135 and the plate is grounded through bypass condenser 136. The output of triode 125b appears in the cathode circuit and is R-C coupled through condenser 137 and resistor 138 to the control grid of pentode 126 which also has a grounded cathode circuit including series resistor 139 and capacitor 140 and bypass capacitor 141. The screen grid of pentode 126 is grounded through resistor 142 and parallel condenser 143. A negative 150 volt bias is provided through resistor 144.

The plate output of pentode 126 is connected directly to the grid of triode 127a. The plate also is connected directly through resistor 145 to the cathode of triode 127a. The plate of 127a is established at the same potential as the plate of triode 125b and grounded through condenser 146. The output is taken from the cathode circuit of 127a and is R-C coupled through condenser 147 and resistor 148 to the grid of triode 127b. Grid bias is provided by the negative 112 volt supply. The plate output passes directly to both plates of double triode 128 connected in parallel and to the input winding of coupling transformer 149. This winding is in parallel with diode 150 and has one side connected through resistor 151 to the positive 150 volt supply. The winding is grounded at this end through bypass capacitor 152. The cathode of 127b and parallel cathodes of double triode 128 are connected in a circuit receiving negative 100 volt supply through resistor 153. The cathode circuit is grounded through condenser 154. The output winding of coupling transformer 149 is connected at one end to the negative 112 volt supply by resistor 155 and is grounded through capacitor 156. Both grids of double triode 128 connect the other end of the output winding and supply a signal to inhibit gate means 17 and also to back-trigger the one shot multivibrator 16.

The back-triggering function supplies a signal to the grid of triode 113b in the multivibrator through coupling condenser 157 in series with diode 158. The output of diode 158 is also connected to the positive 50 volt supply by resistor 159. Its input is grounded through resistor 160 and connected to the multivibrator cathode circuit by resistor 161. Thus, at the same time the output of pulse amplifier 18 is inhibiting gate means 17, it forces the multivibrator to end its timing state. The output of the gate is inhibited until the one shot multivibrator has had time to switch back into its stable condition.

The signal from the pulse amplifier 18 also supplies through condenser 166 both grids of double triode 162 forming the gate means. Grid bias is provided through resistor 163 from the negative 150 volt supply. Both cathodes of the gate 162 are connected in parallel to the negative 100 volt supply and by resistor 164 to one grid of triode 108 in the adder circuit 15. The cathodes also are connected through resistors 164 and 165 to ground. The parallel plates of the gate are connected to the cathode circuit of triode 108 of adder 15 from which is taken the input to the integrator 19.

The input to the integrator thus is a fast rising and falling pulse the width of which is equal to the time interval between the outputs of discriminator 9 and discriminator 12. The width of the pulse is integrated by pentode 167. Each gated pulse is received by the control grid of pentode 167 through diode 168 having a bypass condenser 169 and connected in series with input resistor 170. Negative grid bias is provided through resistor 171. The suppressor grid is connected directly to the cathode circuit and to ground by resistor 172 and parallel capacitor 173. A variable resistor 174 provides a constant voltage drop in the cathode circuit for variable power supply voltages provided from the negative 150 volt supply. The screen grid is connected through resistor 175 and series condenser 176 to ground. Through a voltage divider between ground and the negative 150 volt supply including variable resistor 177 and fixed resistors 178 and 179, the screen is connected to the cathode circuit.

The plate output of the integrator pentode 167 supplies the control grid of pentode 180 forming the first stage of D.-C. amplifier 20. The plate circuit is connected to the grid of pentode 180 by resistor 181 and to ground through condenser 182 and one of a series of load resistors 183 depending upon the range within which measurement is being made. The output of the plate circuit thus is a function of the average current through the plate load resistors.

The D.-C. amplifier comprises pentode 180 and double triode 184a 184b. The grid of pentode 180 is connected to ground by capacitor 185 and is biased through resistor 186 by a voltage divider including variable resistor 187 and resistor 188 connected across the positive 150 volt supply and ground. Plate voltage is supplied from the positive 150 volt source through resistor 189 to the plate of pentode 180, through resistor 190 to the plate of 184a and directly to the plate of 184b. The screen grid of the pentode is connected directly to the plate and the suppressor grid directly to the cathode and to the positive 150 volt supply by resistor 191.

The grid of triode 184a is coupled to the plate output of pentode 180 by coupling register 192 and capacitor 193. Grid bias is also provided from the negative 150 volt source through resistor 194. The cathode of triode 184a is grounded. The plate output is coupled by resistor 195 and condenser 196 to the grid of triode 184b. Negative bias is provided by resistor 197 connected to the negative 150 volt supply which also supplies the cathode through resistor 198.

The output of the D.-C. amplifier appears across terminal 199 in the cathode circuit of triode 184b and ground. A direct reading panel meter 21 displays the instrument output, which also is available as an analog voltage at terminal 22. The cathode of pentode 180 connectes the cathode of triode 184b through variable resistor 200 to provide a zero adjustment for the panel meter.

*Circuit values*

| Component | Value |
|---|---|
| Triodes 75a, 75b; 77a, 77b; 113a, 113b; 125a, 125b; 127a, 127b | 6922 Amperex. |
| Pentode 76, 126, 167 | 6688 Amperex. |
| Triode 78, 108, 128, 162 | Type 7044. |
| Condenser 79, 81, 90, 91, 94, 96, 102, 103, 107, 129, 132, 140, 141, 143, 146, 152, 154, 156, 166 | .01 mfd. |
| Resistor 80, 83, 85, 131, 134, 175 | 68 ohms. |
| Resistor 82, 130 | 91 ohms. |
| Condenser 84, 116, 136, 173, 176 | 1.0 mfd. |
| Inductor 86, 133 | 1.5 mh. |
| Condenser 87, 97, 106, 112, 137, 147 | .001 mfd. |
| Resistor 88, 98, 109, 117, 121, 138, 148, 160, 161, 163, 164, 165, 171, 172, 89 | 100,000 ohms. |
| Resistor 89, 139 | 20 ohms. |
| Resistor 92, 135, 144, 145 | 220 ohms. |
| Resistor 93, 101, 102, 104, 142, 151, 153, 155, 178, 190 | 10,000 ohms. |
| Diode 99, 150 | 1N93, G.E. |
| Transformer 100, 149 | A–10172–01, E-H. |
| Diode 105, 114, 158 | 1N34, Sylvania. |
| Resistor 110 | 1,000 ohms. |
| Condenser 111, 122 | 10 mmfd. |
| Resistor 115, 118, 119 | 3,900 ohms. |
| Condenser 120, 182 | 250 mmfd. |
| Condenser 157 | 30 mmfd. |
| Resistor 159 | 220,000 ohms. |
| Diode 168 | 3/4M150Z10, Motorola. |
| Variable resistor 174 | 25,000 ohms. |
| Variable resistor 177 | 50,000 ohms. |
| Resistor 179 | 24,000 ohms. |
| Pentode 180 | Type 6267. |
| Resistor 181, 186 | 100 megohms. |
| Resistor 183 | 11, 1 megohms; 100,000 ohms. |
| Triode 184a, 184b | Type 5965. |
| Condenser 185 | 500 mmfd. |
| Variable resistor 187 | 100,000 ohms. |
| Resistor 188 | 510,000 ohms. |
| Resistor 191 | 39,000 ohms. |
| Resistor 192 | 200,000 ohms. |
| Condenser 193, 196 | 30 mmfd. |
| Resistor 194, 197 | 470,000 ohms. |
| Resistor 195 | 300,000 ohms. |
| Resistor 198 | 18,000 ohms. |
| Variable resistor 200 | 1,000 ohms. |

Suitable power supply and range switch circuit elements necessary to provide a complete measuring instrument will be apparent to those skilled in this art. The foregoing circuits have been illustrated for a single time measurement time channel only set up to measure the turn-on time interval of a transistor having the transient characteristics of FIG. 1. However, it will be understood that several time measurement channels as descried in connection with FIG. 2 may be combined in one instrument to provide means for measuring not only the turn-on time of a transistor, but also such times of interest as transistor storage or fall time.

The foregoing detailed description has been given for clearness of understanding only and no unnecessary limitations should be understood therefrom for specific circuit modifications will be obvious to those skilled in the art, as for measuring the transient characteristics of diodes and other high speed electronic components. The invention is defined by the following claims.

We claim:

1. An instrument for measuring transient characteristics of an electronic component comprising a pulse generator connected to drive said component; and at least one independent channel for measuring the time interval between two predetermined values of a transient function of said component including a first value sensing discriminator connected to said pulse generator and producing an output at one predetermined value of said transient function; means for forming the output of said first discriminator into a fast rising pulse of long duration including a pulse amplifier, a multivibrator triggerd in one direction by the output of said pulse amplifier; an adder for combining the output of said pulse amplifier and said multivibrator; a second value sensing discriminator connected to said component and producing an output at the other predetermined value of said transient function; gate means actuated by the output of said adder and inhibited by the output of said second discriminator for producing a series of pulses having a pulse width equal to said time interval; said multivibrator connected to said second discriminator and triggered in the other direction by the output of the second discriminator; and means for integrating said pulses to produce an instrument output signal proportional to the average width of said pulses.

2. Apparatus for measuring the dynamic characteristics of an electrical component comprising means to supply pulsed electrical waves to the component, a pair of voltage responsive devices, one of said voltage responsive devices being connected to respond to the input signal to the component and the other of said voltage responsive devices being connected to respond to the output signal from the component after its activation by the input signal, means to control the level at which each of the voltage responsive devices becomes sensitive to signals applied thereto, a gate circuit connected to respond to the control of the output signals from each of the voltage responsive devices, the signal from the first voltage responsive device enitiating gate operation and the signal from the second voltage responsive device inhibiting operation, and means to produce an output signal proportional to the average period of gate activation.

3. Circuitry to measure the transient and dynamic characteristics of an electrical component which comprises means to energize the component with substantially rectangular shaped control pules of substantially regularly repeating characteristics, a first voltage discriminator connected to receive and respond to the pulse signals applied to the component to be tested, a second voltage discriminator connected to respond to the output signal from the component following the application of the pulse energy thereto, bias means associated with each of the discriminators for establishing the level at which each discriminator responds to the applied controlling voltage thereby selectively to produce output signals from the discriminators concurrently with the applied controlling voltage reaching the established level of operation and for a time duration during which the applied signal exceeds the established level of operation, a gate circuit connected to respond to the combined output of the two discriminators, operative gate opening periods being initiated under the control of the output of the first of the discriminators and gate opening being inhibited by the output signal from the second of the discriminators, and means for producing from the gate circuit output signals having a duration proportional to the periods of gate opening and closing.

References Cited by the Examiner
UNITED STATES PATENTS

| | | | |
|---|---|---|---|
| 2,444,935 | 7/1948 | Kurtz | 324—68 |
| 2,544,685 | 3/1951 | Jackson | 324—57 |
| 2,877,412 | 3/1959 | Most | 324—68 |
| 3,074,017 | 1/1963 | Sunstein et al. | 324—158 |

OTHER REFERENCES

"Wide Range Electronic Chronoscope," article in Electronics, September 1951, pp. 120–124.

WALTER L. CARLSON, *Primary Examiner.*

SAMUEL BERNSTEIN, *Examiner.*

M. SHARP, A. E. RICHMOND, *Assistant Examiners.*